United States Patent
Kim (10) Patent No.: US 10,340,569 B2
(45) Date of Patent: Jul. 2, 2019

(54) MULTIPLEXER AND LOW PASS FILTER FOR MULTIPLEXER

(71) Applicant: Kyu Yong Kim, Gunpo-si (KR)

(72) Inventor: Kyu Yong Kim, Gunpo-si (KR)

( * ) Notice: Subject to any disclaimer, the term of this patent is extended or adjusted under 35 U.S.C. 154(b) by 57 days.

(21) Appl. No.: 15/548,205

(22) PCT Filed: Jan. 28, 2016

(86) PCT No.: PCT/KR2016/000915
§ 371 (c)(1),
(2) Date: Aug. 2, 2017

(87) PCT Pub. No.: WO2016/126045
PCT Pub. Date: Aug. 11, 2016

(65) Prior Publication Data
US 2018/0269556 A1   Sep. 20, 2018

(30) Foreign Application Priority Data

Feb. 5, 2015   (KR) .................. 10-2015-0018141

(51) Int. Cl.
*H04J 1/02* (2006.01)
*H01P 1/212* (2006.01)
(Continued)

(52) U.S. Cl.
CPC .............. *H01P 1/212* (2013.01); *H01P 1/202* (2013.01); *H01P 1/213* (2013.01); *H01P 5/12* (2013.01); *H04B 1/40* (2013.01); *H04J 1/08* (2013.01)

(58) Field of Classification Search
CPC .......... H01P 1/212; H01P 1/202; H01P 1/213; H01P 5/12; H04B 1/40
(Continued)

(56) References Cited

U.S. PATENT DOCUMENTS 3,917,906 A * 11/1975 Johnson ................. H04J 1/04
                                                                348/388.1
4,081,609 A *  3/1978 Beene ................... H04M 19/04
                                                                370/485
(Continued)

FOREIGN PATENT DOCUMENTS

JP       2004-015096 A    1/2004
KR  20-2000-0008550 U    5/2000
(Continued)

OTHER PUBLICATIONS

International Search Report for PCT/KR2016/000915 dated Jun. 2, 2016 from Korean Intellectual Property Office.

*Primary Examiner* — Thai D Hoang
(74) *Attorney, Agent, or Firm* — Paratus Law Group, PLLC (57) ABSTRACT

A multiplexer through which different frequency bands pass, including: a housing that includes an I/O terminal and a channel group which inputs and/or outputs frequencies of different ranges, includes a plurality of connectors, and is separated from the I/O terminal; a low-pass filter provided inside the housing, electrically connected to the I/O terminal, and formed of a distributed constant type; a common capacitor provided in parallel to the low-pass filter and electrically connected to a contact point between the I/O terminal and the low-pass filter; and a cavity filter which includes a plurality of cavities which are formed in the housing and a resonator which is respectively installed in the cavities.

10 Claims, 6 Drawing Sheets

(51) Int. Cl.
*H01P 1/213* (2006.01)
*H04B 1/40* (2015.01)
*H01P 1/202* (2006.01)
*H01P 5/12* (2006.01)
*H04J 1/08* (2006.01)

(58) Field of Classification Search
USPC .................................. 370/480–497, 532–541
See application file for complete search history.

(56) References Cited

U.S. PATENT DOCUMENTS

| | | | | | |
|---|---|---|---|---|---|
| 4,242,542 | A | * | 12/1980 | Kimbrough | H04B 3/38 370/293 |
| 4,326,288 | A | * | 4/1982 | Fettweis | H04J 4/005 370/480 |
| 4,519,071 | A | * | 5/1985 | Miller | H04J 3/0685 370/503 |
| 4,644,535 | A | * | 2/1987 | Johnson | H04Q 11/04 370/376 |
| 4,852,086 | A | * | 7/1989 | Eastmond | H04B 1/66 370/343 |
| 5,150,365 | A | * | 9/1992 | Hirata | H04J 1/045 348/E7.049 |
| 5,790,555 | A | * | 8/1998 | Narahashi | H03G 3/30 370/480 |
| 5,825,777 | A | * | 10/1998 | Komarek | H04M 1/723 370/458 |
| 6,408,008 | B1 | * | 6/2002 | Komarek | H04J 3/0682 370/458 |
| 6,556,559 | B1 | * | 4/2003 | Mitsume | H04B 17/318 370/337 |
| 7,110,511 | B2 | * | 9/2006 | Goodman | H04L 12/2801 348/E7.051 |
| 7,729,617 | B2 | * | 6/2010 | Sheth | H04B 10/801 370/465 |
| 7,742,393 | B2 | * | 6/2010 | Bonicatto | H04B 3/54 340/12.37 |
| 2003/0092397 | A1 | | 5/2003 | Uriu et al. | |
| 2005/0129069 | A1 | * | 6/2005 | Binder | H04L 12/2801 370/493 |
| 2005/0249245 | A1 | * | 11/2005 | Hazani | H04L 5/06 370/485 |

FOREIGN PATENT DOCUMENTS

| | | |
|---|---|---|
| KR | 10-2003-0039319 A | 5/2003 |
| KR | 10-0899102 B1 | 5/2009 |
| KR | 10-0899103 B1 | 5/2009 |

\* cited by examiner

MULTIPLEXER AND LOW PASS FILTER FOR MULTIPLEXER

CROSS REFERENCE TO PRIOR APPLICATIONS

This application is a National Stage Patent Application of PCT International Patent Application No. PCT/KR2016/000915 (filed on Jan. 28, 2016) under 35 U.S.C. § 371, which claims priority to Korean Patent Application No. 10-2015-0018141 (filed on Feb. 5, 2015), which are all hereby incorporated by reference in their entirety.

BACKGROUND

An exemplary embodiment of the present invention relates to the multiplexer and the low-pass filter for the same.

A multiplexer is a device for speeding up a data communication by multiplexing several data transmission lines. It is a combinational circuit that connects a communication system between a base station and a user terminal by connecting one selected input line among several input lines to single output line, or a data received through single input line to several output lines. It may be referred to simply "MUX". In addition, it is also referred to 'Data Selector' as it is possible to make a single output with multiple-input data.

Conventionally, STDM (Statistical Time Division Multiplexer) supporting from 19.2 kbps to 56 kbps has been widely used to transmit data but has disadvantage that voice and data cannot be implemented together. It makes T1 grade MUX became generalized which has not only secure high-speed transmission section but also mixed operate after combining various communication networks like phone, fax or video conferencing system to data communication network.

The multiplexer processes a wide range of frequency band therefor, the interference between the low frequency band and high frequency band can occur when the difference between the low frequency band and high frequency band is double. It make multiplexer hard to process low-frequency band because of harmonic generation therefrom.

SUMMARY

The purpose of the present invention provides a multiplexer and a low-pass filter which can remove the harmonic by minimizing the band interference when processing a wide range of frequency bands.

According to an exemplary embodiment of the present invention, the multiplexer through which different frequency bands pass may comprise a housing that includes an I/O terminal and a channel group which inputs and/or outputs frequencies of different ranges, includes a plurality of connectors, and is separated from the I/O terminal, a low-pass filter provided inside the housing, electrically connected to the I/O terminal, and formed of a distributed constant type, a common capacitor provided in parallel to the low-pass filter and electrically connected to a contact point between the I/O terminal and the low-pass filter, and a cavity filter which includes a plurality of cavities which are formed in the housing and a resonator which is respectively installed in the cavities, wherein a part of the cavity filter is electrically connected between the low-pass filter and a part of the channel group, and wherein the other part of the cavity filter is electrically connected between the common capacitor and the other part of the channel group.

In an exemplary embodiment, the cavity filter includes the cavities which are formed by forming grooves from an upper portion toward a lower portion, wherein the plurality of cavities are arranged in a plurality of rows and a plurality of columns, and wherein the plurality of cavities on both ends of the plurality of rows or the plurality of columns among the plurality of cavities form a plurality of connection passages so as to be connected to each other corresponding to signal transmission paths.

In an exemplary embodiment, each of the plurality of connection passages includes a transmission line for signal transmission between the pluralities of cavities which are located on both ends.

In an exemplary embodiment, the frequency band which passes through the low-pass filter is lower than the frequency band which passes through the common capacitor.

In an exemplary embodiment, the low-pass filter includes a plurality of capacitor elements which is formed of a capacitive conductor of a disk shape and a plurality of inductor elements which is formed in a rod shape, wherein the plurality of capacitor elements and the plurality of inductor elements are alternately arranged.

In an exemplary embodiment, one end and the other end of the low-pass filter are configured with the plurality of capacitor elements.

In an exemplary embodiment, a capacitance value of the capacitor element on the one end or the other end of the plurality of capacitor elements is smaller than capacitance values of the other capacitor elements by forming the capacitor element on the one end or the other end of the plurality of capacitor elements differently in size, diameter, or shape from the other capacitor elements.

In an exemplary embodiment, the capacitor element on the one end or the other end of the plurality of capacitor elements has a slope, which has a protrusion in the center, on one side.

In an exemplary embodiment, the common capacitor includes a coaxial line, an external conductor which is separated from an outer perimeter of the coaxial line through a space, and a dielectric material which fills the space.

In an exemplary embodiment, the dielectric material is formed of Teflon.

According to the exemplary embodiment of present invention, a low-pass filter connected to a capacitor by a T-junction and used for a multiplexer may comprise a plurality of capacitor elements which is formed of a capacitive conductor of a disk shape and a plurality of inductor elements which connects the capacitor elements to each other and is formed in a rod shape, wherein the plurality of capacitor elements and the plurality of inductor elements are alternately arranged, and wherein the capacitor element which is connected to the capacitor has a capacitance value smaller than a capacitance value which is determined by a cut-off frequency of the low-pass filter.

In an exemplary embodiment, one end and the other end of the low-pass filter are configured with the capacitor elements.

In an exemplary embodiment, a capacitance value of the capacitor element on the one end or the other end of the plurality of capacitor elements is smaller than capacitance values of the other capacitor elements by forming the capacitor element on the one end or the other end of the plurality of capacitor elements differently in size, diameter, or shape from the other capacitor elements.

In an exemplary embodiment, the capacitor element on the one end or the other end of the plurality of capacitor elements has a slope, which has a protrusion in the center, on one side.

According to an exemplary embodiment of the present invention, separating the low frequency band and high frequency band to minimize interference between two frequency bands can remove the harmonic that possibly generated in low frequency band when low and high frequency bands are processed. The multiplexer accomplishes well phase matching when low-pass filter connects to common capacitor with T-junction. As using the single multiplexer as a parameter, an implementation of a broader frequency band communication is possible to make simplification and streamlining of the devices and equipment and lead to reduction of costs consequently.

DETAILED DESCRIPTION

The present invention can be applied to various modification and have a number of exemplary embodiments; therefor, some of specific embodiments will now be explained in detail with the blueprints. However, this is not intended to limit the invention to the specific embodiment but may include all of the modifications, equivalents and substitutes in whole scope of idea and technology of the present invention.

In the following description of the present invention, if a detailed description of a related art is regarded as unnecessarily obscuring the subject matter of the present invention, the detailed description may be omitted. Moreover, the number used in the description (e.g., the first second, and so on) may be an identification symbol to distinguish the one component to another component.

In addition, the mention of one component "is connected to" the other component or "is link to" may indicate directly connection or link but it also may be connected or linked through the intermediary of another component in the middle as long as the specifically opposite case is not mentioned.

Figure 1:
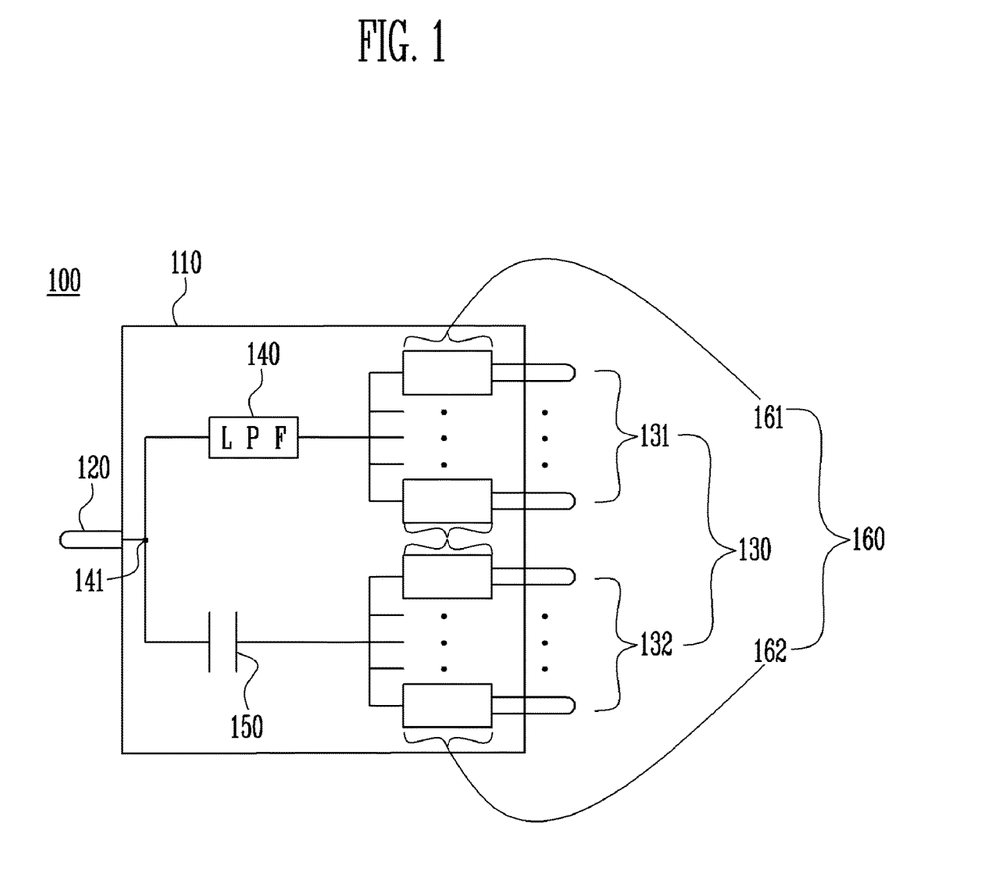
FIG. 1 is the schematic block diagram showing a multiplexer according to an exemplary embodiment of the present invention.

Hereinafter, a specific content for the practice of the invention will be described with reference to the accompanying drawings FIG. 1 is a brief diagram showing a multiplexer according to an exemplary embodiment of the present invention.

Referring FIG. 1, the multiplexer 100 according to an exemplary embodiment of the present invention includes a housing 110, a single input/output (I/O) terminal 120, a channel group 130 comprised of more than one connector 131 and 132, a low-pass filter 140, a common capacitor 150, and a filter cavity 160.

The single I/O terminal 120 and the channel group 130 can be installed in mutually separated space in housing 110. The single I/O terminal 120 and the channel group 130, each of which can be input or output frequencies. Herein, the channel group 130 can be composed each of the low-frequency connector 131 and the high frequency connector 132. The connectors 131 and 132 may be provided at least one of each channel group and each of the connectors 131 and 132 may be input or output a different frequency bands. For example, the low-frequency connector 131 may be input or output of the band 700 MHz to 1000 MHz and the high frequency connector 132 may be input or output the band 1700 MHz to 2600 MHz.

The low-pass filter 140 is installed on one side of the inner housing 110 and may be electrically connected between the input and output terminal 120 and the low-frequency connector 131. The low-pass filter 140 composed with a plurality of capacitor element and a plurality of inductor element that are disposed alternately to each other may be formed in a distributed integer line. Herein, the capacitor element comprising of a disc-shaped capacitive conductors may operate as a low impedance section. The inductor element comprising of rod shape may operate as a high-impedance section while connects the capacitor element.

In addition, the frequency band passing through the low-pass filter 140 can pass a lower frequency band than the frequency band through the common capacitor 150, for example, the 700 MHz 1000 MHz band. Moreover, the frequency band passing through the common capacitor 150 can pass a higher frequency band than the frequency band passing through the low-pass filter 140, for example, 1700 MHz to 2600 MHz band.

As described above, the multiplexer 100 in accordance with an exemplary embodiment of the present invention makes low frequency band passed through the low-pass filter 140 while the high frequency band passed through the common capacitor 150. Therefore, it minimizes the interference between the high and low frequency band and remove harmonic in the low-frequency band caused by interference thereof.

In other words, the multiplexer 100 may pass a broader range of frequency bands. For example, as described above, the multiplexer 100 may pass the low frequency band of 700 MHz to 1000 MHz band and the high frequency band of 1700 MHz to 2600 MHz band. Between the low frequency band and the high frequency band passing through the multiplexer 100 is likely to cause interference. In particular, if the difference of frequency between them is two times, the harmonic may generate in low frequency band due to significant interference. In one example, one of the high frequency bands, 1800 MHz is different in 2 times as one of low frequency bands, 900 MHz among the frequency bands which the multiplexer 100 processing. Therefore, the harmonic generation is the problem in the case of 900 MHz frequency band passing through the multiplexer 100.

The multiplexer 100 according to one embodiment of the present invention makes the low frequency band pass through a distributed integer type low-pass filter 140 while the high frequency band pass through the common capacitor 150 when the frequency differences with each other is more than twice, therefore, it can suppress the generation of harmonics in the low frequency band by minimizing the interference between the low and high frequency band.

Figure 2:
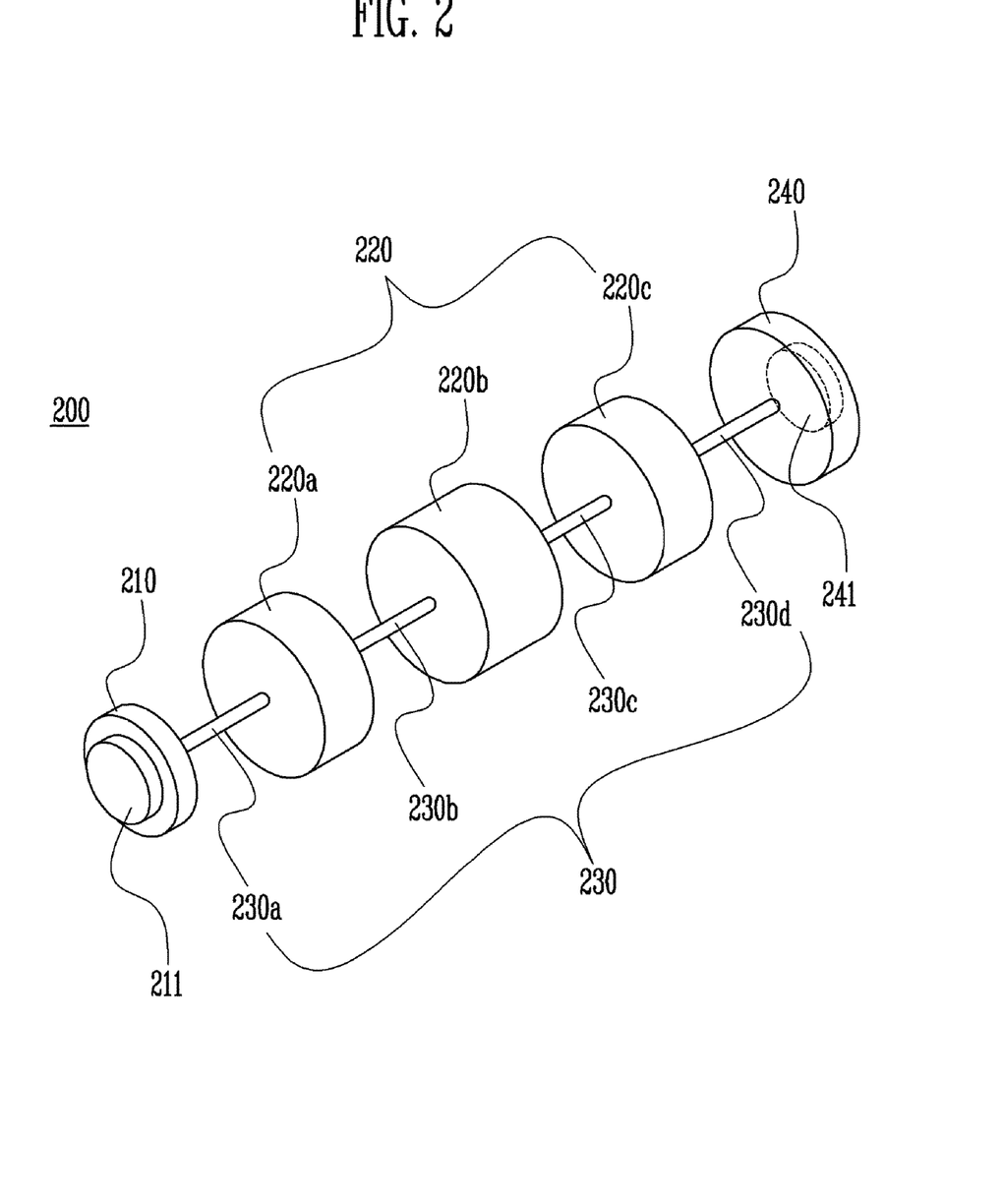
FIG. 2 is the diagram showing a low-pass filter according to an exemplary embodiment of the present invention.

FIG. 2 is a view showing the low-pass filter 200 according to an embodiment of the present invention. Referring FIG. 2, the low-pass filter 200 may be formed of the distributed integer type filter. More specifically, the low-pass filter 200 may include a plurality of capacitor elements of a cylindrical shape 210, 220, and 240 and a plurality of rod-shaped inductor element 230. A plurality of capacitor elements 210, 220, and 240 and the inductor element 230 is disposed alternately with each other and the capacitor elements 210 and 240 may be placed at the one end and the other one of the low-pass filter 200. The protrusions 211 can be formed at the capacitor element 210 and 240 disposed at the one end and the other end of the low-pass filter 200. The protrusion 211 can be electrically connected with the single I/O terminals 120.

Each of the capacitor elements 210, 220, and 240 may be formed with a capacitive conductor in a disk shape. The inductor elements 230 are formed in small rods shape whose diameter is smaller than the diameter of the capacitor elements 210, 220, and 240, and connect the capacitor element 210, 220, and 240. Since the impedance value of the capacitor elements 210, 220, and 240 is smaller than the inductor elements 230, the capacitor elements in the distributed integer low-pass filter 200, 210, 220, and 240 operates as a low impedance while the inductor elements 230 may operate as a high-impedance portion.

Even though the low-pass filter 200 of the distributed integer type low-pass filter shown in FIG. 2 is comprised of 5 capacitor elements 210, 220a, 220b, 220c, and 240 and 4 inductor elements 230a, 230b, 230c, and 230d, the present invention is not limited above. The size and number of the capacitor elements and the inductor elements can be set depending on the cut-off frequency of the low-pass filter 200 of distributed integer type.

In other words, the distributed integer type low-pass filter 140 determines total number of the capacitor element and the inductor element and the capacitance value of capacitor element and inductance value of inductor elements depending on the cut-off frequency. For example, when the cut-off frequency is 1.4 GHz in the distributed integer low-pass filter 140, the distributed integer type low-pass filter 200 shown in FIG. 2 may have 5 capacitor element 210, 220a, 220b, 220c, and 240 and 4 inductor elements 230a, 230b, 230c, and 230d. In the case, the capacitance value of the capacitor element 210, 220a, 220b, 220c, and 240 is determined respectively and the inductance value of the inductor element 230a, 230b, 230c, and 230d is also respectively determined theoretically. As a consequence, diameters and heights of the respective capacitor elements 210, 220a, 220b, 220c, and 240 and diameters and lengths of the respective inductor elements 230a, 230b, 230c, and 230d can be determined.

TABLE 1

| $n^{th}$ degree | 0.01 db ripple | | | |
|---|---|---|---|---|
| | gn | | | |
| | g1 | g2 | g3 | g4 |
| $1^{st}$ degree | 0.0960 | 1.0000 | | |
| $2^{nd}$ degree | 0.4488 | 0.4077 | 1.1007 | |
| $3^{rd}$ degree | 0.6291 | 0.9702 | 0.36291 | 1.0000 |

[Table 1] shows the prototype (gn) value corresponding to the each degree of the distributed integer type low-pass filter 140, in the case of setting frequency of bandpass of the distributed integer type low-pass filter 140 has a ripple of 0.01 db as the value of the prototype g0 of the distributed integer type low-pass filter 140 sets 1 when the cut-off frequency of the distributed integer low-pass filter 140 sets 1. Calculation method of the value of the prototype (gn) is general information; therefore a detailed description is omitted.

As shown in [Table 1], when the cut-off frequency of the distributed integer low-pass filter 140, a prototype value, and the frequency of bandpass of the distributed integer low-pass filter 140 is given, by the corresponding to the each degree, the value of the inductance and capacitance of the inductor element 230a, 230b, 230c, and 230d of the capacitor element 210, 220, and 240 can be determined. Therefore, the distributed integer low-pass filter 140 can be designed using the capacitor element set 210, 220, and 240 and the inductor elements 230a, 230b, 230c, and 230d.

The low-pass filter 140 may be connected to the common capacitor 150 with the T-Junction when the distributed integer type low-pass filter 140 is employed by the multiplexer 100 according to an embodiment of the present invention, That is, the one end of the capacitor elements of the low-pass filter 140 and 210 may be connected to the common capacitor 150 with T-junction and it may be connected to the single I/O terminal 120 electrically. When the low-pass filter 140 and the common capacitor 150 are linked, the one end of the capacitor elements of the low-pass filter 140 and 210 and a common capacitor 150 is connected. Thereafter, a problem is occurred that the phase matching between the capacitor element 210 and the common capacitor 150 cannot be achieved.

According to an embodiment of the present invention, the low-pass filter 140 achieves a phase matching between the capacitor element 210 and the common capacitor 150 by making smaller the capacitance value of the capacitor element 210, which is located in the one end to the low-pass filter 140 connecting the common capacitor 150 with T-junction than the theoretical value of the capacitor element 210. More specifically, as described above, the total number of the capacitor elements and the inductor elements and respectively corresponding capacitance values and inductance values are theoretically determined according to the cut-off frequency in the distributed integer type low-pass filter 140. When the capacitor element located in the one end of the distributed integer type low-pass filter is connected to the common capacitor with T-junction, it cannot achieve a phase matching. However, the phase matching is well achieved if the capacitor value of the capacitor element located in the one end of the distributed integer type low-pass filter which is connected the common capacitor with T-junction is smaller than the theoretical capacitance value which described above.

According to an exemplary embodiment, to making smaller a capacitance value of a capacitance element 210 which is located in the one end of the low-pass filter 200 connection with a common capacitor with T-junction than the theoretical capacitance value, the size or diameter of the capacitance element located in the one end of the distributed integer type low-pass filter 210 may be formed smaller than the size or diameter of the capacitance which is theoretically determined. The capacitor elements and the inductor elements are arranged symmetrically in the distributed integer type low-pass filter which is thermionically determined. For example, in case of having 5 capacitor elements as in FIG.

2, around the capacitor element 220b located at the center of 5 capacitor elements, the inductor elements 230b and 230c which is adjacent to the capacitor 220b have same inductance value and the inductor elements which is located outside the inductor elements 230b and 230c also have equal value each other.

However, in theory, if the same size of the capacitor elements 210 and 240 have the same capacitance value, the capacitor element 210 connected to a common capacitor 150 with T-junction cannot achieved the phase matching. Therefore, the capacitor element 210 connected to the common capacitor 150 with T-junction has a smaller capacitance value formed by making smaller in height or diameter than the capacitor element 240, which has a theoretical capacitance value for the phase matching.

The capacitance value of the capacitor element 210 can be made smaller than thermionically determined capacitance value by forming smaller diameter or the height of the capacitor element 210 which located in the one end of the low-pass filter connected to common capacitor with T-junction, than one of other capacitor elements 240. In this way, the phase matching can be easily achieved.

Figure 3:
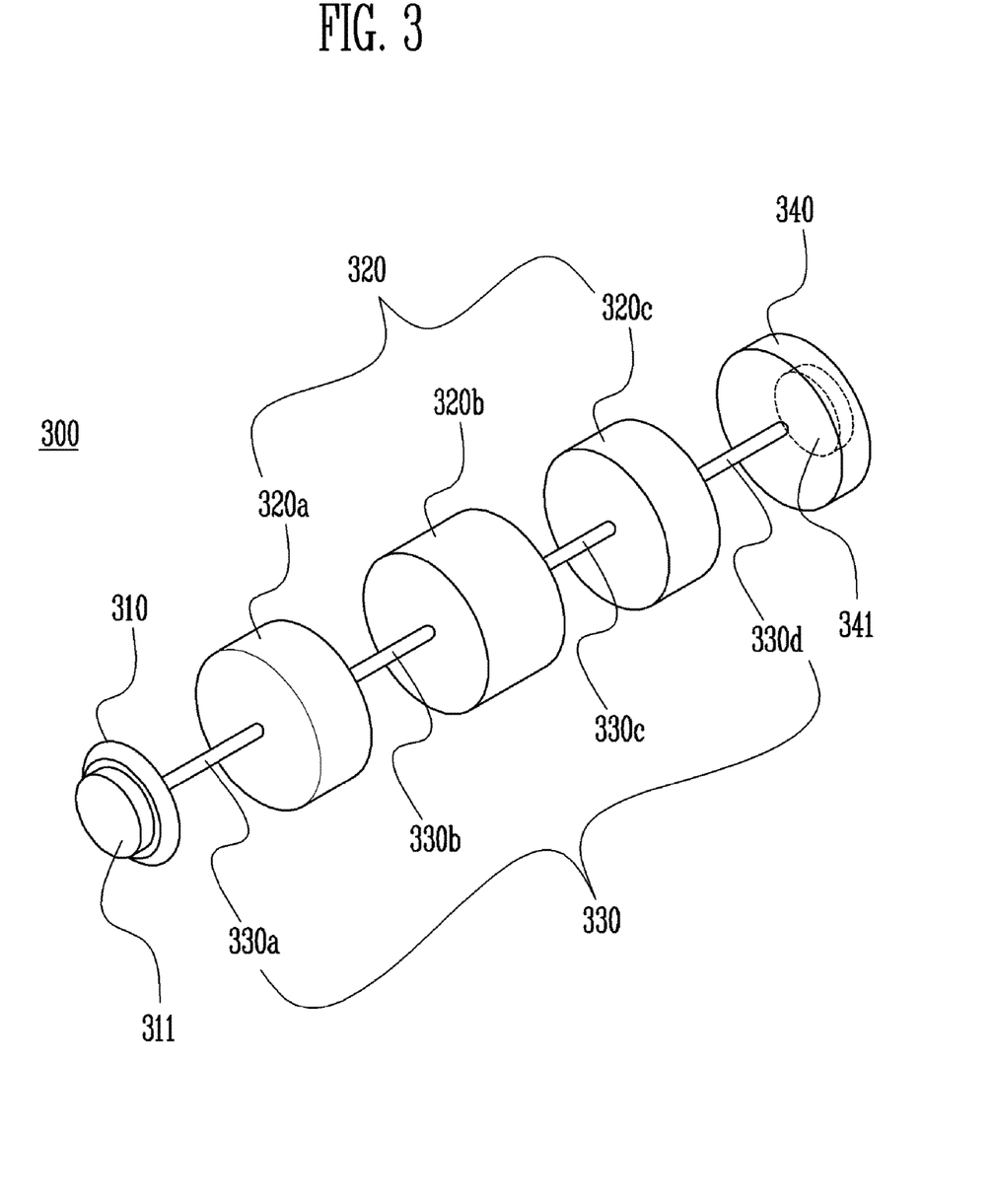
FIG. 3 is the diagram showing a low-pass filter in accordance with another exemplary embodiment of the present invention.

FIG. 3 is a view showing a low-pass filter 300 in accordance with another embodiment of the present invention. Capacitor elements 310 and 330 may be disposed in the one end and the other end in the low-pass filter 300. Wherein one capacitor element 310 disposed in the one end of the low-pass filter 300 has a protruding portion 311 forming in the center of the capacitor element 310 which may be electrically connected to the single I/O terminal 120

The other capacitor elements except the one end 310 and the other end 340 may be disposed in a symmetrical shape around the center of the low-pass filter 300.

Each of the capacitor elements 310, 320, and 340 may operate as a low impedance portion by forming capacitive conductor in disk shape. In addition, an inductor element 330 may operate in a high-impedance portion by forming in rods shape connecting the capacitor element 310, 320, and 340.

The capacitor element 310 located in the one end of the low-pass filter 300 is connected to the common capacitor 150 with T-junction, whereby the outer surface is formed to have a slope is smaller than the theoretical capacitance value, as described above, the phase matching with the common capacitor 150 may be able to achieve easily. The common capacitor 150 installed in parallel with the low-pass filter 140, is electrically connected to between the contact point 141 of the single I/O terminal 120 and the low-pass filter 140 and the high frequency band channel group 132. As an example, the one end of the common capacitor 150 may connect the capacitor element 210 located in the one end of low-pass filter 140 to the single I/O terminal by T-junction. The other end of the common capacitor 150 may be connected with the filters 162 which process the high frequency band.

The higher frequency band than the frequency band to pass through the low-pass filter 140, for example, the frequency band of 1700 MHz to 2600 MHz is inputted through the high frequency channel group 132 and the frequency bands pass through the filter 162 connected to of respective channel group 132 and it can be transmitted to the single I/O terminal 120 through the common capacitor 150.

Figure 4:
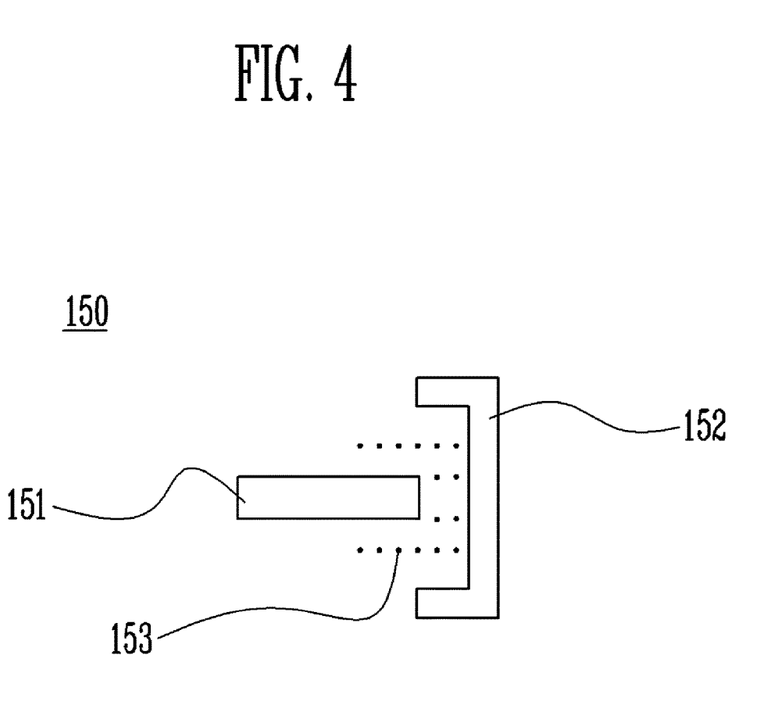
FIG. 4 is the schematic block diagram showing a common capacitor according to an exemplary embodiment of the present invention.

FIG. 4 is a schematic view showing the common capacitor 150, according to an embodiment of the present invention. Referring to FIG. 4, the common capacitor 150 may be formed of a coaxial line 151, the outer conductor 152 having a separated space from a perimeter of coaxial line 151, and dielectric 153 filled the separated space. The dielectric 153 may be formed of Teflon.

The common capacitor 150 can pass the higher frequency band than the frequency band passing through the low-pass filter 140. For example, the band passing through the low-pass filter 140 is 700 MHz~1000 MHz range and the band passing through a common capacitor 150 may be 1700 MHz~2600 MHz range. As described above, by passing the high frequency band through the common capacitor 150 and the low frequency band through the low-pass filter 140, the interference between the high frequency band and a low frequency band and may be minimized. Therefore, the harmonic that may occur in the low-frequency band caused by the interference mentioned above can be removed.

A conventional multiplexer may occur an interference between the low frequency and high frequency because the frequency of the different bands implemented within one device. As a result, A conventional multiplexer have had a limit of input and output frequency band because a harmonic may be generated when low frequency pass the multiplexer due to the interference.

However, the multiplexer 100 according to an embodiment of the present invention uses the low-pass filter 140 and the common capacitor 150, as described above. A low frequency band, for example, 700 MHz~1000 MHz range of the frequency band passes through the low-pass filter 140 and a high frequency band, for example, 1700 MHz~2600 MHz range of the frequency band passes through the common capacitor 150. Therefore, the harmonic generation when low frequency band passed through the multiplexer 100 can be eliminated.

In addition, the low-pass filter 140 and the common capacitor 150 are connected by T-junction when the multiplexer 100 is implemented. In this case, the low-pass filter 140 and the common capacitor 150 have pre-determined capacitance value in accordance with the cut-off frequency. If those values are used, a phase matching is not accomplished properly at the contact point 141 of the low-pass filter 140 and the common capacitor 150. At this time, to accomplish a proper phase matching, the multiplexer 100 according to an embodiment of the present invention make smaller, a capacitance value of the one end of capacitor element 210, 310 which are disposed in the low-pass filter 140 than the capacitance value that is pre-determined a capacitor value according to the cut-off frequency, as an example the size or diameter of one end of capacitor elements 210, 310 make smaller than the other capacitor element of the symmetry, or the capacitor elements 210, 310 can be formed differently from the capacitor element of the symmetry.

This multiplexer 100 according to an embodiment of the present invention includes wider range of a frequency band than a conventional multiplexer, in particular, if difference between high and low frequencies are double, it can pass through a low frequency band and high frequency band, whereby it can achieve a cost reduction due to simplification and streamlining of the equipment constituting the communication system.

A filter 161 disposed between the low-pass filter 140 and the low-frequency channel groups 131 and other filter 162 disposed between the common capacitor 150 and the high frequency channel groups 132, may be the cavity filter 160.

The cavity filter 160 forms the housing 110 including a plurality of cavities therein, and a resonators are provided in each of the cavities, whose parts of them provides electrical connection between the low-pass filter 140 and low-frequency channel groups 131, and the others may provide electrical connection between the common capacitor 150 and the high frequency channel groups 132.

The cavity filter 160 may form a groove toward the lower direction from the upper and equipped to cavities. The cavities may be disposed to form a plurality of rows and a plurality of columns. The cavities located opposite ends of rows and column among mentioned cavities may form a plurality of connection passages connected to each other in response to the signal transmission path.

Wherein the transmission line for signal transmission between the cavities located at the opposite ends of the connection passage may be inserted and installed within each of the connection passage.

Figure 5A:
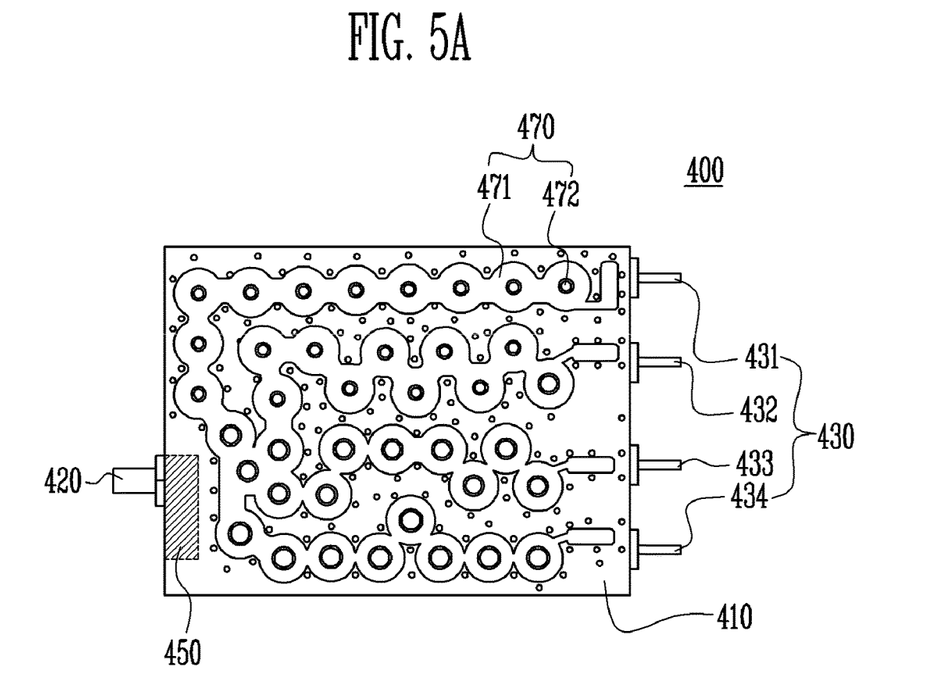
FIGS. 5A and 5B are blueprints showing a multiplexer according to an exemplary embodiment of the present invention.
Figure 5B:
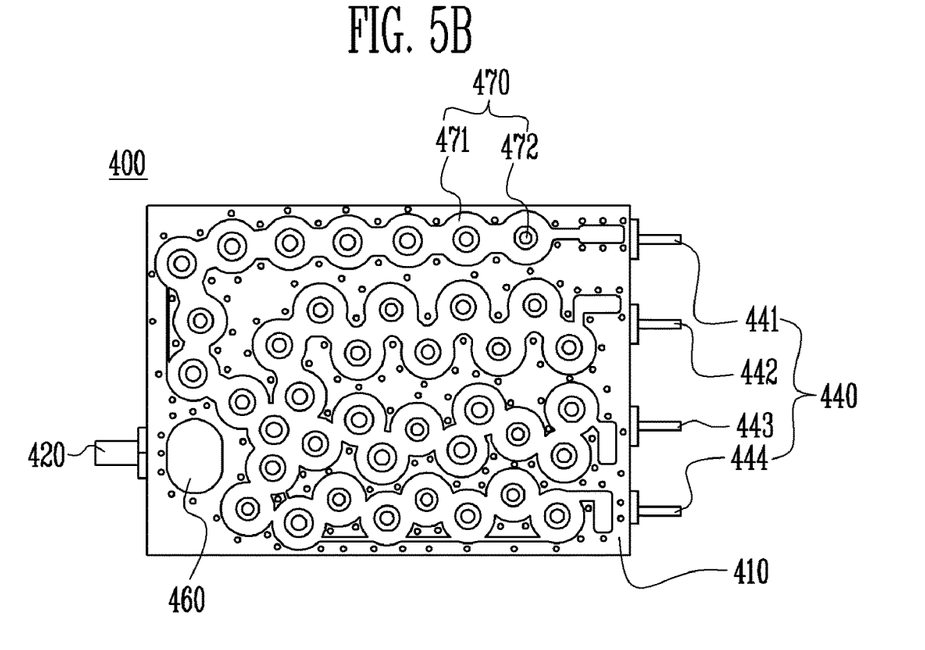
Figure 6:
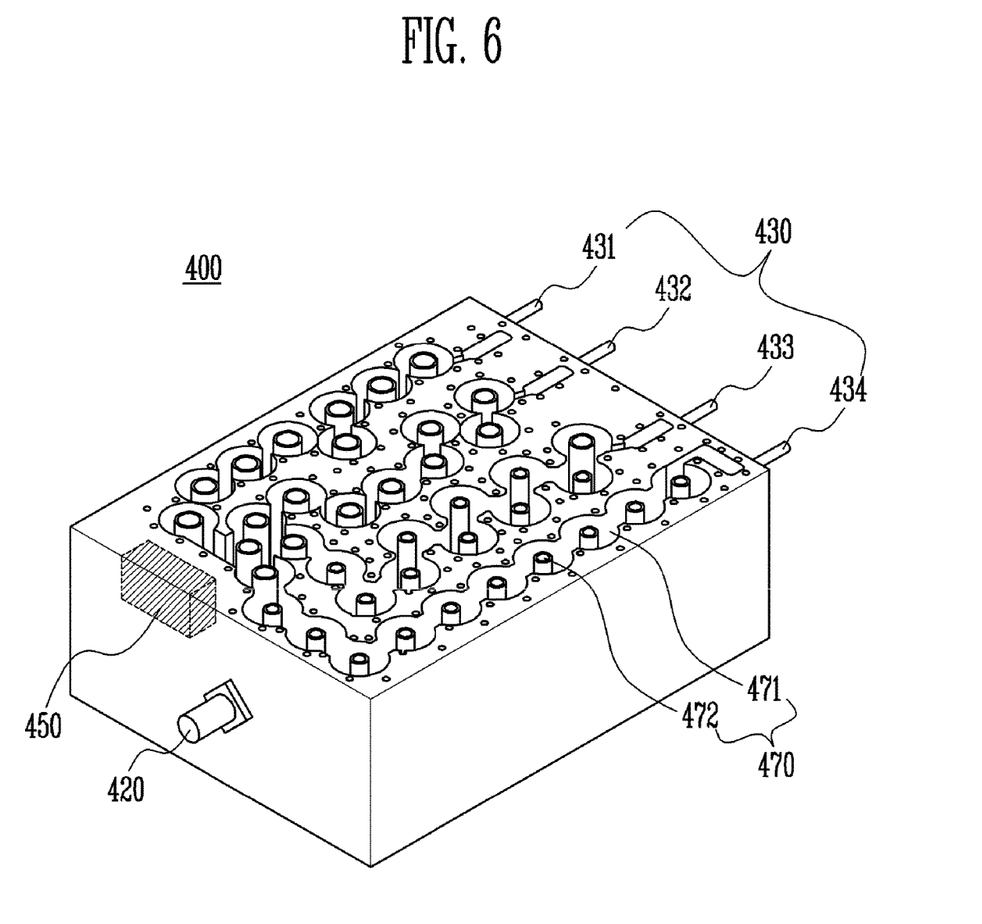
FIG. 6 is a perspective view of a multiplexer according to an exemplary embodiment of the present invention.

FIGS. 5A and 5B are blueprints showing a multiplexer 400 in accordance with another embodiment of the present invention using a cavity filter. FIG. 6 is a perspective view of the multiplexer 400 shown in FIGS. 5A and 5B. More specifically, FIG. 5A is a plan view of the multiplexer 400 in accordance with one embodiment of the present invention, FIG. 5B is a bottom view of the multiplexer 400 in accordance with one embodiment of the present invention.

Referring FIGS. 5A and 5B, the multiplexer 400 comprises a housing 410, a single I/O terminal 420 separated by the housing 410, a channel group 430 and 440 comprised by connectors which input/output different band of frequencies 432, 433, 434, 441, 442, 443, and 444, a cavity filter 470, a low-pass filter 450, and a common capacitor 460.

Referring FIG. 6, the multiplexer 400 comprises the housing 410, the single I/O terminal 420 separated by the housing 410, the channel group 430 and 440 comprised by connectors which input/output different band of frequencies 432, 433, 434, 441, 442, 443, and 444, the cavity filter 470, the low-pass filter 450, and the common capacitor (not shown here).

The cavity filter 470 is comprised of the cavities 471 which formed by cutting housing 410 perpendicularly from the outside to inside by the predetermined depth and equipped with resonator 472 in the center of the cavity 471 toward the direction of the cavity formed. In addition, each of the cavities 471 can be connected to adjacent one in the direction from the single I/O terminal 420 to the channel group 430 and 440

The part of the cavity filter 470 may connect electrically between the low-pass filter 450 and low-frequency channel groups 430 and the other part of the cavity filter 470 connect electrically between the common capacitor 460 and the high frequency channel groups 440.

According to an exemplary embodiment of the present invention, the multiplexer 400 utilize the low-pass filter 450 in a low frequency bang and the common capacitors 460 in a high frequency band passing the frequency, so that the multiplexer 400 may remove the harmonic generation when a low frequency band pass the multiplexer 400.

In addition, the low-pass filter 450 and the common capacitor 460 can be connected with T-junction, in this case, the low-pass filter 450 and the common capacitor 460 have pre-determined capacitance values accordance with the cut-off frequency. If those values are used, a phase matching is not accomplished properly at the contact point of the low-pass filter 450 and the common capacitor 460. At this time, to accomplish a proper phase matching, the multiplexer 400 according to an embodiment of the present invention may make smaller capacitance value of the capacitor elements 210 and 310 which are disposed in the one end of low-pass filter 450 than other pre-determined capacitor value in accordance with the cut-off frequency, as an example the size or diameter of one end of the capacitor elements 210 and 310 is made smaller than the other capacitor element of the symmetry, or the capacitor elements 210 and 310 may be formed differently from the capacitor element of the symmetry.

The multiplexer 400 according to an embodiment of the present invention may pass wider range of a frequency band than a conventional multiplexer, in particular, if difference between high and low frequencies are double, whereby it can achieve a cost reduction due to simplification and streamlining of the equipment constituting the communication system.

Above explanation is merely shown the example of skilled art and technology of present invention. Those skilled in art of this field may be able to make a variety of modifications and variations without departing from the scope of present invention.

Therefore, certain described embodiment of present invention is not intended to limit the art of skill but give an explanation and that example may not limit the art of skill and ideas.

The scope of the present invention shall be determined only according to the attached claims and equivalent art of skill and ideas are also be included in the spirit and scope of these claims.

What is claimed is:

1. A multiplexer through which different frequency bands pass comprising:
   a housing that includes an I/O terminal and a channel group which inputs and/or outputs frequencies of different ranges, includes a plurality of connectors, and is separated from the I/O terminal;
   a low-pass filter provided inside the housing, electrically connected to the I/O terminal, and formed of a distributed constant type;
   a common capacitor provided in parallel to the low-pass filter and electrically connected to a contact point between the I/O terminal and the low-pass filter; and
   a cavity filter which includes a plurality of cavities which are formed in the housing and a resonator which is respectively installed in the cavities,
   wherein a part of the cavity filter is electrically connected between the low-pass filter and a part of the channel group, and
   wherein the other part of the cavity filter is electrically connected between the common capacitor and the other part of the channel group.

2. The multiplexer of claim 1, wherein the cavity filter includes the cavities which are formed by forming grooves from an upper portion toward a lower portion,
   wherein the plurality of cavities are arranged in a plurality of rows and a plurality of columns, and
   wherein the plurality of cavities on both ends of the plurality of rows or the plurality of columns among the plurality of cavities form a plurality of connection passages so as to be connected to each other corresponding to signal transmission paths.

3. The multiplexer of claim 2, wherein each of the plurality of connection passages includes a transmission line for signal transmission between the pluralities of cavities which are located on both ends.

4. The multiplexer of claim 1, wherein the frequency band which passes through the low-pass filter is lower than the frequency band which passes through the common capacitor.

5. The multiplexer of claim 1, wherein the low-pass filter includes a plurality of capacitor elements which is formed of a capacitive conductor of a disk shape; and a plurality of inductor elements which is formed in a rod shape, wherein the plurality of capacitor elements and the plurality of inductor elements are alternately arranged.

6. The multiplexer of claim 5, wherein one end and the other end of the low-pass filter are configured with the plurality of capacitor elements.

7. The multiplexer of claim 6, wherein a capacitance value of the capacitor element on the one end or the other end of the plurality of capacitor elements is smaller than capacitance values of the other capacitor elements by forming the capacitor element on the one end or the other end of the plurality of capacitor elements differently in size, diameter, or shape from the other capacitor elements.

8. The multiplexer of claim 7, wherein the capacitor element on the one end or the other end of the plurality of capacitor elements has a slope, which has a protrusion in the center, on one side.

9. The multiplexer of claim 1, wherein the common capacitor includes a coaxial line;

an external conductor which is separated from an outer perimeter of the coaxial line through a space; and a dielectric material which fills the space.

10. The multiplexer of claim 9, wherein the dielectric material is formed of Teflon.

\* \* \* \* \*